United States Patent
Choi et al.

(10) Patent No.: US 9,857,777 B2
(45) Date of Patent: Jan. 2, 2018

(54) CONTROL SYSTEM FOR CONTROLLING GOODS SORTER AND OPERATION METHOD THEREOF

(71) Applicant: ELECTRONICS AND TELECOMMUNICATIONS RESEARCH INSTITUTE, Daejeon (KR)

(72) Inventors: Yong hoon Choi, Daejeon (KR); Ki Hak Kim, Cheongju (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 15/414,532

(22) Filed: Jan. 24, 2017

(65) Prior Publication Data
US 2017/0235282 A1    Aug. 17, 2017

(30) Foreign Application Priority Data
Feb. 12, 2016    (KR) .......................... 10-2016-0016456

(51) Int. Cl.
| G06F 7/00 | (2006.01) |
| G05B 13/02 | (2006.01) |
| B65G 17/34 | (2006.01) |
| B65G 47/48 | (2006.01) |
| B65G 47/96 | (2006.01) |

(52) U.S. Cl.
CPC ......... *G05B 13/021* (2013.01); *B65G 17/345* (2013.01); *B65G 47/48* (2013.01); *B65G 47/962* (2013.01)

(58) Field of Classification Search
None
See application file for complete search history.

(56) References Cited

U.S. PATENT DOCUMENTS

| 2004/0073333 A1* | 4/2004 | Brill .......................... B07C 3/08 700/224 |
| 2012/0097584 A1* | 4/2012 | Neebe .................. G06Q 10/083 209/606 |
| 2014/0091015 A1 | 4/2014 | Kim et al. |
| 2015/0217334 A1 | 8/2015 | Kim |

FOREIGN PATENT DOCUMENTS

| KR | 20-0172972 Y1 | 3/2000 |
| KR | 10-2014-0042992 A | 4/2014 |
| KR | 10-2015-0092578 A | 8/2015 |

* cited by examiner

*Primary Examiner* — Yolanda Cumbess

(57) ABSTRACT

Provided is a control system including controller configured to manage ID information comprising a unique number of a carrier on which a goods is mounted from among a plurality of carriers provided to tilt in a second direction or a third direction, such that each of the carriers moves along the first direction on a goods sorter and sorts the goods to at least one of a plurality of sorting openings, a recognizer configured to sense a material of the goods and a falling point at which the goods falls in a sorting opening, and an analyzer configured to generate result data obtained by analyzing a tilting speed and a tilting strength of the carrier, wherein the controller outputs a controls signal such that the at least one of the tilting speed and the tilting strength of the carrier is controlled based on the result data.

12 Claims, 5 Drawing Sheets

CONTROL SYSTEM FOR CONTROLLING GOODS SORTER AND OPERATION METHOD THEREOF

CROSS-REFERENCE TO RELATED APPLICATIONS

The patent application claims priority under 35 U.S.C. §119 of Korean Patent Application No. 10-2016-0016456, filed on Feb. 12, 2016, the entire contents of which are hereby incorporated by reference.

TECHNICAL FILED

The present disclosure herein relates to a control system for controlling a sorter and an operation method thereof.

DESCRIPTION OF THE RELATED ART

Due to growth of mobile and internet shopping, a supply of parcel delivery service increases every year. Accordingly, a mail center or a private distribution center uses a sorter and a control system for efficiently sorting the supply of parcel delivery service. Recently, a new sorting device such as a cross belt type or an e-tray type is being developed and commercialized. Accordingly, the goods sorter may sort goods from small size goods to large size goods in a high speed.

The cross belt type sorter includes a carrier formed of a rubber belt. Accordingly, the cross belt type sorter may also process a thin mail in a high speed. However, due to continual friction of mails, the rubber belt of the carrier may be worn down and goods may not be sorted to a desired place. The worn down rubber belt may be replaced with a new rubber belt, and such a process may cost a lot of money.

SUMMARY

The present disclosure provides a control system for controlling a goods sorter in order to sort goods accurately and an operation method thereof.

An embodiment of the inventive concept provides a control system including a controller configured to manage ID information including a unique number of a carrier on which a goods is mounted from among a plurality of carriers provided to tilt in a second direction or a third direction, which is perpendicular to a first direction, such that each of the carriers moves along the first direction on a goods sorter and sorts the goods to at least one of a plurality of sorting openings, a recognizer disposed on the at least one sorting opening and configured to sense a material of the goods and a falling point at which the goods falls in a sorting opening corresponding to the ID information, and an analyzer configured to generate result data obtained by analyzing at least one of a tilting speed and a tilting strength of the carrier on which the goods is mounted on the basis of the ID information, the falling point and information on the material of the goods, wherein the controller outputs a controls signal such that the at least one of the tilting speed and the tilting strength of the carrier on which the goods is mounted is controlled based on the result data.

In an embodiment, the control system may further include a transmitter configured to transmit the control signal to the goods sorter.

In an embodiment, the analyzer may analyze a magnitude of a friction force between the goods and the carrier on which the goods is mounted on a basis of the material information.

In an embodiment, the recognizer may include a camera configured to capture an image of the falling point and the material of the goods.

In an embodiment, the recognizer may include a sensor configured to sense the falling point and the material of the goods.

In an embodiment, the recognizer may output warning data and the material information on the goods, when the goods falls out of a reference area set based on the sorting opening corresponding to the ID information.

In an embodiment, the analyzer may generate the result data so as to adjust, to a negative value, an operation delay value of the carrier on which the goods is mounted on a basis of the warning data and the material information, when the goods falls out of the reference area in the first direction.

In an embodiment, the analyzer may generate the result data so as to adjust, to a positive value, an operation delay value of the carrier on which the goods is mounted on a basis of the warning data and the material information, when the goods falls out of the reference area in a reverse direction to the first direction.

In an embodiment, the second direction may be toward an entrance of the sorting opening corresponding to the ID information and may be perpendicular to the first direction, and when the goods falls out of the reference area in the second direction, the analyzer may generate the result data so as to adjust, to a positive value, the tilting strength of the carrier on which the goods is mounted on a basis of the warning data and the material information.

In an embodiment, the analyzer may generate the result data such that at least one of the tilting speed and the tilting strength of the carrier on which the goods is mounted is adjusted, when the goods falls in excess of a specific range from the reference area.

In an embodiments of the inventive concept, an operation method of a control system including one or more computing devices, each of which includes a processor, the operation method includes receiving, by a processor, a falling point of and material information on a goods sensed by a recognizer, which is disposed on at least one of a plurality of sorting openings and includes at least one of a sensor and a camera, in a goods sorter including the plurality of sorting openings and a plurality of carriers configured to sort a goods into at least one of the plurality of sorting openings, analyzing, by the processor, at least one of a tilting speed and a tilting strength of a carrier on which the goods is mounted among the plurality of carriers on a basis of the falling point of and the material information on the goods and generating result data, and outputting, by the processor, a controls signal such that the at least one of the tilting speed and the tilting strength of the carrier on which the goods is mounted is controlled based on the result data.

In an embodiment, information about the falling point of the goods may include a falling point of the goods fallen out of a reference area of the at least one sorting opening.

BRIEF DESCRIPTION OF THE FIGURES

The accompanying drawings are included to provide a further understanding of the inventive concept, and are incorporated in and constitute a part of this specification. The drawings illustrate exemplary embodiments of the inventive concept and, together with the description, serve to explain principles of the inventive concept. In the drawings.

DETAILED DESCRIPTION

Figure 1:
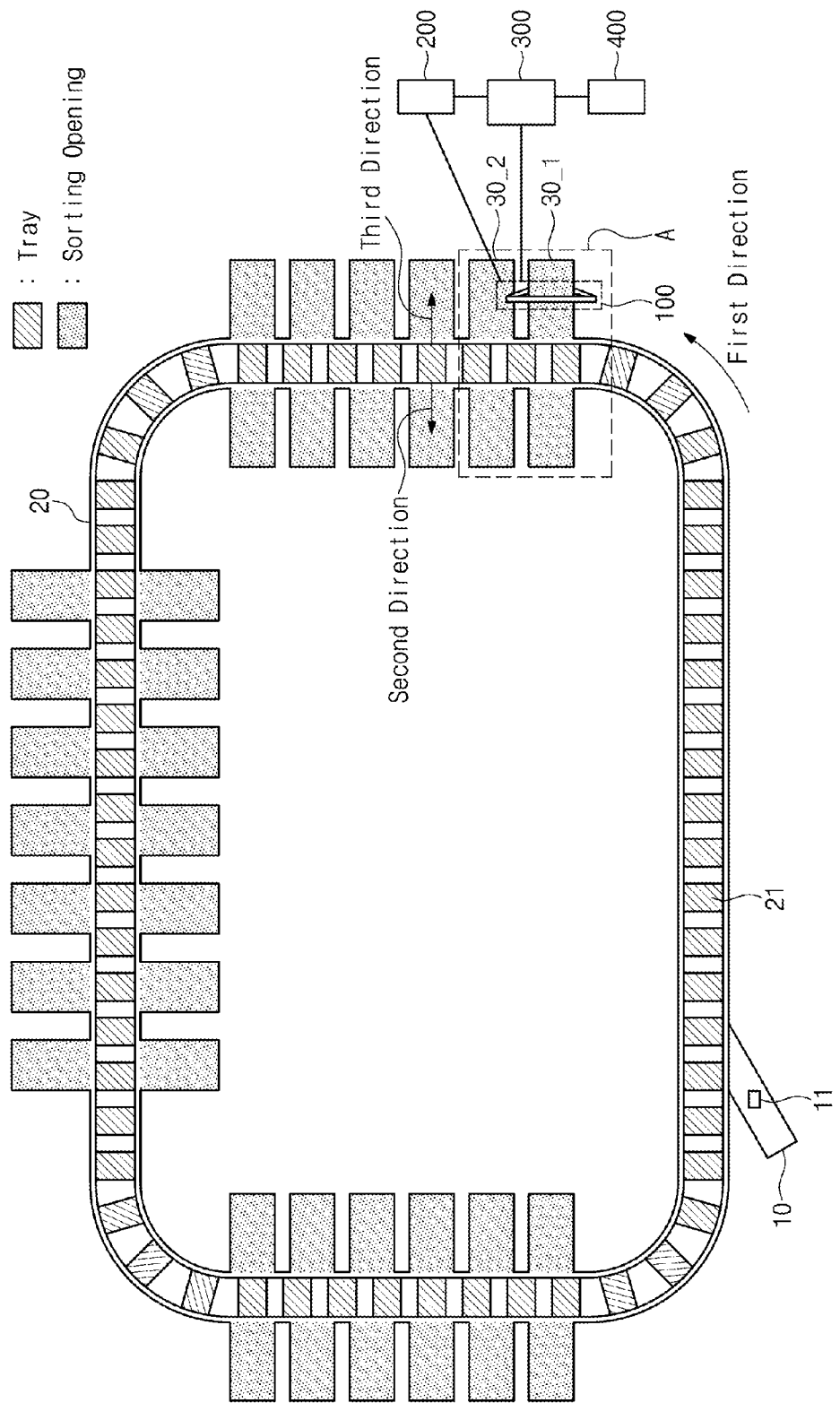
FIG. 1 is a block diagram illustrating a goods sorter and a control system according to an embodiment of the inventive concept.

Exemplary embodiments of the inventive concept may be variously modified and realized in various forms, and thus specific embodiments will be exemplified in the drawings and described in detail hereinbelow. However, the inventive concept is not limited to the specific disclosed forms, and needs to be construed to include all modifications, equivalents, or replacements included in the spirit and technical range of the inventive concept. Like reference numerals refer to like elements throughout. In the drawings, the dimensions of structures are exaggerated for clarity of illustration. It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the singular forms "a," "an" and "the" are intended to include the plural forms as well, unless the context clearly indicates otherwise.

It will be further understood that the terms "comprises", "comprising,", "includes" and/or "including", when used herein, specify the presence of stated features, integers, steps, operations, elements, components or combinations thereof, but do not preclude the presence or addition of one or more other features, integers, steps, operations, elements, components, or combinations thereof. It will also be understood that when a part such as a layer, a film, a region, or a plate, etc., is referred to as being 'on' another part, it can be "directly on" the other part, or intervening part may also be present. On the contrary, it will be understood that when a part such as a layer, a film, a region, or a plate, etc., is referred to as being 'under' another part, it can be "directly under", and one or more intervening parts may also be present.

FIG. 1 is a block diagram illustrating a goods sorter and a control system according to an embodiment of the inventive concept. Referring to FIG. 1, a lead-in unit 10 may lead goods for mailing and/or for parcel delivery service including acceptance information in a goods sorter 20. The goods sorter 20 may receive the goods from the lead-in unit 10.

The goods sorter 20 may be a conveyor for sorting the goods and have a closed loop shape. The goods sorter 20 may include a plurality of carriers for carrying the goods. Each of the plurality of carriers may be similar or identical to a first carrier 21. The goods sorter 20 may move the plurality of carriers in a first direction.

For example, the plurality of carriers may have a cross belt carrier type. Each of the plurality of carriers of the cross belt type may automatically sort the goods to a desired position. Each of the plurality of carriers may selectively tilt in a second or third direction. The plurality of carriers may sort the goods to a plurality of sorting openings. Each of the plurality of carriers may include a rubber belt on a side joined with the goods sorter 20 in order to tilt in the second or third direction. The second and third direction may be perpendicular to a moving direction (i.e. the first direction) of the plurality of carriers 21. The second direction may be an inner side direction of the goods sorter 20. Also, the third direction may be an outer side direction of the goods sorter 20. In addition, each of the plurality of carriers has unique ID information. For example, the ID information may include a number of each of the plurality of carriers.

Each of the plurality of sorting openings may be similar or identical to a first sorting opening 30_1 and a second sorting opening 30_2. Each of the plurality of sorting openings may be installed in the second and third directions on the basis of the goods sorter 20 and may receive the goods 11 from the plurality of carriers. Each of the plurality of sorting openings may be independently installed according to a destination, a type, and/or a weight of the goods. For example, the destination may be a delivery place of each goods. In this example, a sorting opening for a first delivery place may be independently installed from a sorting opening for a second delivery place.

Referring to FIG. 1, a recognizer 100, an analyzer 200, a controller 300, and a transmitter 400 may be provided to monitor and control an operation of the goods sorter 20. The recognizer 100, the analyzer 200, the controller 300, and the transmitter 400 may configure a control system for controlling an operation of the goods sorting opening 20. The recognizer 100, the analyzer 200, the controller 300, and the transmitter 400 may be realized in a hardware, software, or hybrid type.

In the hardware type, each of the recognizer 100, the analyzer 200, the controller 300, and the transmitter 400 may include one or more digital and/or analog circuits for performing operations described later. In the software type, each of the recognizer 100, the analyzer 200, the controller 300, and the transmitter 400 may include one or more instruction codes formed to perform operations described later. The instruction codes may be compiled or interpreted, and processed with an instruction set by one or more processors.

The recognizer 100 may be installed in a part or the entirety of the plurality of sorting openings. For example, the recognizer 100 may be installed in sorting openings through which a relatively large amount of goods are received from among the plurality of sorting openings. For example, the recognizer 100 may be installed on the first sorting opening 30_1. The recognizer 100 may include various sensors or a camera. For example, the recognizer 100 may include an infrared sensor and/or an optical sensor. The sensors may be installed in the sorting opening in an air curtain type. The recognizer 100 may sense a falling point of and/or material information about the goods. A goods sensing method of the recognizer 100 will be described in detail in relation to FIGS. 5 to 8. The recognizer 100 may transmit the falling point information of and/or material information about the goods to the analyzer 200.

The analyzer 200 may predict a worn degree of a rubber belt of the carrier 21 on the basis of information received from the recognizer 100. The analyzer 200 may generate analyzed result data in order to transmit a predicted result to the controller 300. The analyzer 200 may transmit the analyzed result data to the controller 300.

The controller 300 may output a control signal for changing an operation control variable of the goods sorter 20 on the basis of the analyzed result data. In detail, the controller 300 may transmit, to the transmitter 400, a control signal for controlling a tilting speed and/or strength of the first carrier 21. The transmitter 400 may transmit the control signal to the goods sorter 20. Operations of the recognizer 100, the analyzer 200, the controller 300, and the transmitter 400 will be described in detail in relation to FIG. 3.

Figure 2:
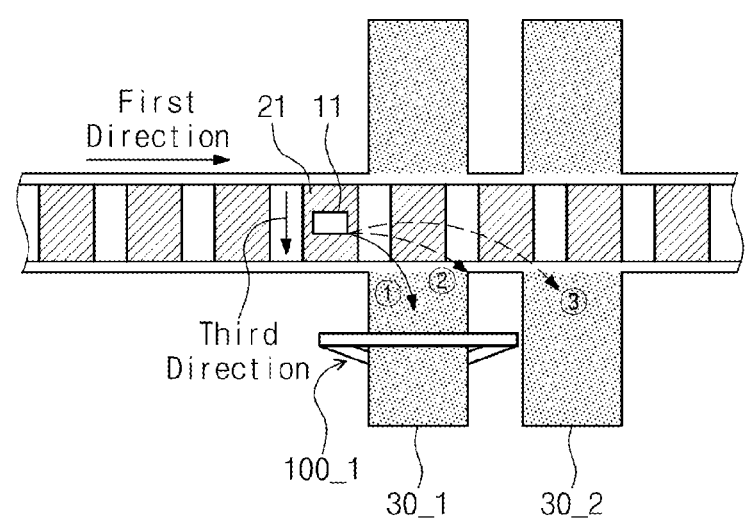
FIG. 2 is a block diagram illustrating a goods sorting method of the goods sorter of FIG. 1.

FIG. 2 is a block diagram illustrating a goods sorting method of the goods sorter of FIG. 1. FIG. 2 is view of enlarging a portion A in FIG. 1 for showing a goods sorting method of the goods sorter 20.

Referring to FIGS. 1 and 2, the goods sorter 20 may move the carriers in the first direction. The first carrier 21 among the carriers may be carrying the goods 11. The first carrier 21 may sort the goods 11 to the first sorting opening 30_1. The first carrier 21 may tilt to the third direction in order to sort the goods 11. In order to accurately sort the goods to the first sorting opening 30_1, the goods 11 is required to fall in a first arrow direction ①. In order to make the goods fall in the first arrow direction ①, the first carrier 21 tilts to the third direction at a specific time.

However, when the rubber belt of the first carrier 21 is worn down, a friction force may be lowered. When the goods 11 slips from the first carrier 21 due to lowering of friction force, the goods 11 may not be accurately sorted. When the friction force is lowered, the goods 11 may fall in a second arrow direction ② or in a third arrow direction ③. When falling in the second arrow direction ② the goods 11 may fall between the first sorting opening 30_1 and the second sorting opening 30_2. Alternatively, when falling in the third arrow direction ③, the goods 11 may fall to the second sorting opening 30_2. In order to prevent the goods 11 from being wrongly sorted, a first recognizer 100_1 may be positioned on the first sorting opening 30_1. A method of sensing the goods 11 by the recognizer 100 will be described in detail in relation to FIGS. 4 to 7.

Figure 3:
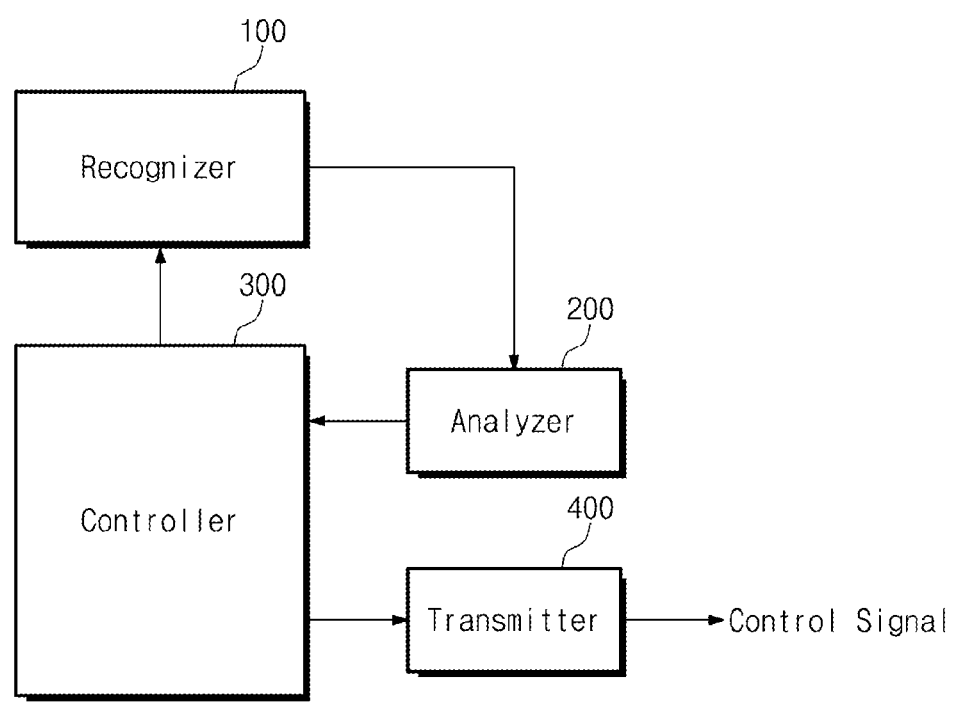
FIG. 3 is a block diagram illustrating in detail the control system of FIG. 1.

FIG. 3 is a block diagram illustrating in detail the control system of FIG. 1. Referring to FIGS. 1 and 3, the recognizer 100, the analyzer 200, the controller 300, and the transmitter 400 may be provided to control the operation of the goods sorter 20. As illustrated in FIGS. 1 and 2, the recognizer 100 may be provided on one or more sorting openings.

The recognizer 100 may include at least one of a camera and/or a sensor. The recognizer 100 may sense a falling point and/or a material of the goods 11 that falls to a sorting opening. In addition, the recognizer 100 may receive, from the controller, ID information on a carrier (e.g. the first carrier 21) used for sorting the goods 11.

For example, when the falling point of the goods 11 gets out of a reference area of the sorting opening, the recognizer 100 may output warning data. The reference area may be a criterion for analyzing a worn degree of the rubber belt of the carrier 21. For example, when the goods 11 falls within the reference area, the operation of the carrier 21 may be determined to be stable. The sorting opening will be described in detail in relation to FIGS. 5 to 8. The recognizer 100 may transmit, to the analyzer 200, the ID information on the carrier 21, warning data, and/or material information on the goods 11.

The analyzer 200 may analyze the worn degree of the rubber belt of the carrier 21 on the basis of warning data of the goods 11 and/or material information on the goods 11, which are/is received from the recognizer 100. The analyzer 200 may sense how far the goods 11 get out of the reference area of the sorting opening through the warning data. In addition, the analyzer 200 may sense the friction force between the carrier 21 and the goods 11 through the material information on the goods 11. The method for analyzing, by the analyzer 200, the worn degree of the rubber belt of the carrier 21 will be described in relation to FIGS. 5 to 8. The analyzer 200 may transmit, to the controller 300, analyzed result data and the ID information on carrier 21 received from the recognizer 100.

The controller 300 may transmit the ID information on the carrier (e.g. the first carrier 21) to the recognizer 100. The controller 300 may detect in advance carrying schedule information such as a plurality of pieces of ID information on the plurality of carriers. In addition, the controller 300 may manage the plurality of pieces of ID information on the plurality of carriers.

The controller 300 may receive the analyzed result data from the analyzer 200. The controller 300 may change an operation control variable of the goods sorter 20 on the basis of the analyzed result data. For example, on the basis of the analyzed result data, the controller 300 may control the goods sorter 20 to change the operation of the carrier 21. According to the analyzed result data, the controller 300 may control the goods sorter 20 to decrease or increase the tilting speed of the carrier 21. In addition, according to the analyzed result data, the controller 300 may control the goods sorter 20 to adjust the tilting strength of the carrier 21. The controller 300 may transmit the control signal to the transmitter 400. The transmitter 400 may transmit the control signal to the goods sorter 20 on the basis of the control of the controller 300.

The analyzer 200 and the controller 300 may be realized in one computer. For example, the analyzer 200 and the controller 300 may share the same processor in one computer. In addition, the analyzer 200 and the controller 300 may include different processors in one computer.

The analyzer 200 and the controller 300 may be realized with one or more computers. For example, the analyzer 200 and the controller 300 may be realized with at least one of one or more personal computers, desktop computer, laptop computers, tablet computers, and mobile devices. In addition, the analyzer 200 and the controller 300 may include processors. In detail, the processor may be included in one or more computers. One or more computers may include a storage and the storage may store software including instruction codes for operating one or more computers. Also, the processor may execute the software.

The recognizer 100, the analyzer 200, the controller 300, and the transmitter 400 may prevent the goods 11 from being wrongly sorted by controlling the operation of the goods sorter 20.

Figure 4:
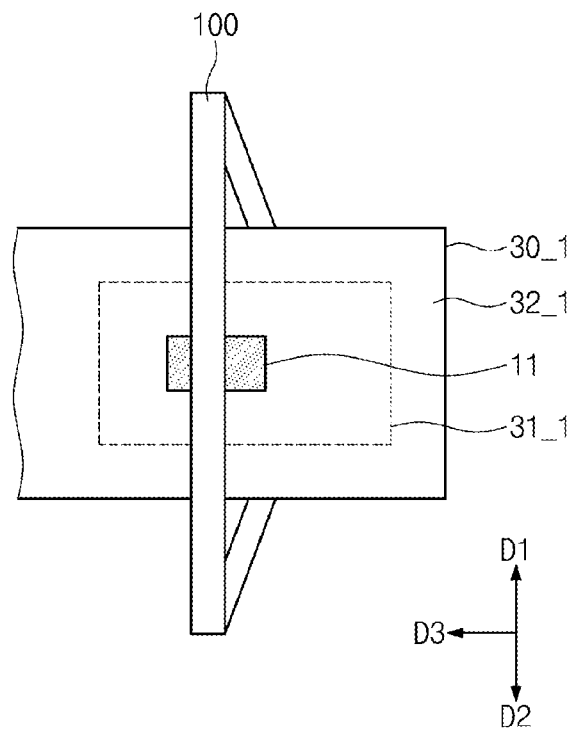
FIG. 4 is a block diagram illustrating a goods detecting method of a recognizer according to an embodiment of the inventive concept.

FIG. 4 is a block diagram illustrating a goods detecting method of the recognizer according to an embodiment of the inventive concept. Referring to FIGS. 1 to 4, it is assumed that the recognizer 100 is disposed on the first sorting opening 30_1. The recognizer 100 may include at least one of a camera and/or a sensor.

The recognizer 100 may sense the reference area 31_1 of the sorting opening 30_1 and a peripheral area 32-1, which is out of the reference area 31_1. The reference area 31_1 may be a criterion through which a worn degree of the rubber belt of the carrier 21 may be analyzed. For example, when the goods 11 falls within the reference area 31_1, the operation of the carrier 21 may be determined to be stable. The reference area 31_1 may be an area set based on the sorting opening. 30_1.

The range of the reference area 31_1 may be determined by a control system manager and may be determined by at least one of the analyzer 200 and the controller 300 on the basis of a size and/or material of the goods 11. In addition, the range of the reference area 31_1 may be determined by at least one of the analyzer 200 and the controller 300 on the basis of the tilting speed and/or strength of the first carrier 21.

The recognizer 100 may sense the falling point of the goods 11. In detail, the recognizer 100 may sense whether the goods 11 falls in the reference area 31_1 or in the peripheral area 32-1 out of the reference area 31_1. Referring to FIG. 4, the goods 11 may fall in the reference area 31_1. When the goods 11 falls in the reference area 31_1, the recognizer 100 may not output warning data.

Figure 5:
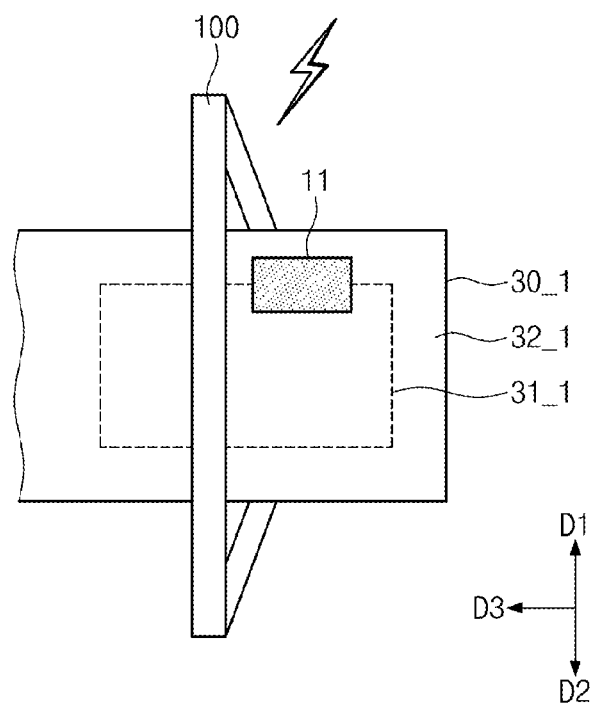
FIG. 5 is a block diagram illustrating a goods detecting method of the recognizer according to an embodiment of the inventive concept.

FIG. 5 is a block diagram illustrating a goods detecting method of the recognizer according to an embodiment of the inventive concept. Referring to FIGS. 4 and 5, the goods 11 may fall in the peripheral area 32_2 out of the reference area 31_1. For example, the goods 11 may fall to get out of the reference area 31_1 in a D1 direction. The D1 direction may be identical to a moving direction (e.g. the first direction) of the carrier (e.g. the first carrier 21). The recognizer 100 may output the warning data including information about the falling point of the goods 11. The recognizer 100 may output the material information on the goods 11 and the ID information on the carrier 21 together with the warning data.

Referring to FIGS. 3 and 5, the recognizer 200 may receive the warning data, the material information, and the ID information on the carrier 21. The analyzer 200 may determine a worn state of the rubber belt of the carrier 21 on the basis of the warning data and the material information. For example, when the goods 11 gets out of the reference area 31_1 in the D1 direction, the analyzer 200 may determine that the tilting speed of the carrier 21 decreases and that an operation delay value of the carrier 21 is required to be adjusted. For example, the analyzer 200 may determine the operation delay value of the carrier 21 to be adjusted to a negative value. When the operation delay value of the carrier 21 is adjusted to the negative value, the tilting speed of the carrier 21 may increase. Exceptionally, when the goods 11 falls in the range out of the reference area 31_1 but does not get out in excess of a specific range, the analyzer 200 may not adjust the operation delay of the carrier 21.

The analyzer 200 may reflect the material information of the goods 11 in order to adjust the operation delay value of the carrier 21. For example, even though the carrier 21 tilts in an identical speed, a falling speed may be different according to the material of the goods 11. When the goods 11 is formed of a material of a large friction force, the goods 11 may fall slower than the goods 11 having a small friction force. Accordingly, when the goods 11 is formed of a material of a large friction force, the analyzer 200 may adjust the operation delay value of the carrier 21 to a negative value but to have a larger operation delay value than that of the goods 11 having a small friction force. The analyzer 200 may transmit analyzed result information including the ID information on the carrier 21 and the operation delay value analyzed on the basis of the fall point information and material information on the goods 11.

Figure 6:
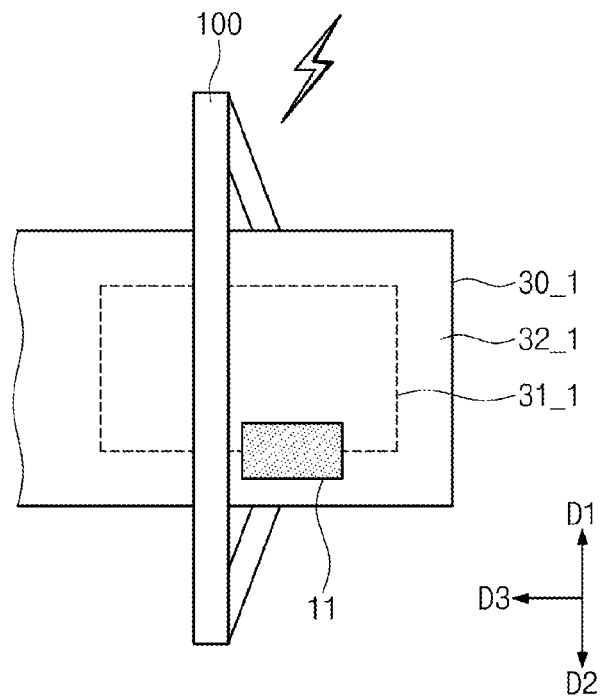
FIG. 6 is a block diagram illustrating a goods detecting method of the recognizer according to an embodiment of the inventive concept.

FIG. 6 is a block diagram illustrating a goods detecting method of the recognizer according to an embodiment of the inventive concept. Referring to FIGS. 4 and 6, the goods 11 may fall in the peripheral area 32_2 out of the reference area 31_1. For example, the goods 11 may fall to get out of the reference area 31_1 in a D2 direction. The D2 direction may be reverse to the moving direction (e.g. the first direction) of the carrier (e.g. the first carrier 21). The recognizer 100 may output the material information on the goods 11 and the ID information on the carrier 21 together with warning data including information about the falling point of the goods 11.

Referring to FIGS. 3 and 6, the recognizer 200 may receive the warning data, the material data, and the ID information on the carrier 21. The analyzer 200 may determine a worn state of the rubber belt of the carrier 21 on the basis of the warning data and the material data. For example, when the goods 11 gets out of the reference area 31_1 in the D2 direction, the analyzer 200 may determine that the tilting speed of the carrier 21 increases and may adjust an operation delay value of the carrier 21. For example, the analyzer 200 may adjust the operation delay value of the carrier 21 to a positive value. When the operation delay value of the carrier 21 is adjusted to the positive value, the tilting speed of the carrier 21 may decrease. Exceptionally, when the goods 11 falls in the range out of the reference area 31_1 but does not get out in excess of a specific range, the analyzer 200 may not adjust the operation delay of the carrier 21.

The analyzer 200 may reflect the material information on the goods 11 in order to adjust the operation delay value of the carrier 21. For example, even though the carrier 21 tilts in an identical speed, a falling speed may be different according to the material of the goods 11. When the goods 11 is formed of a material having a small friction force, the goods 11 may fall faster from the carrier 21 than the goods 11 having a large friction force. Accordingly, when the goods 11 is formed of a material having a small friction force, the analyzer 200 may adjust the operation delay value of the carrier 21 to a positive value but to have a smaller operation delay value than that of the goods 11 having a large friction force. The analyzer 200 may transmit analyzed result information including the ID information on the carrier 21 and the operation delay value analyzed on the basis of the fall point information and material information on the goods 11.

Figure 7:
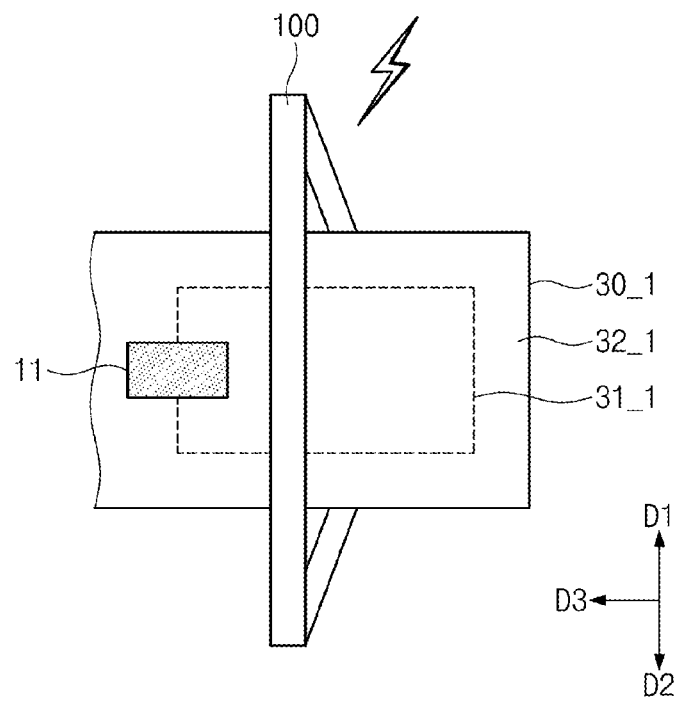
FIG. 7 is a block diagram illustrating a goods detecting method of the recognizer according to an embodiment of the inventive concept.

FIG. 7 is a block diagram illustrating a goods detecting method of the recognizer according to an embodiment of the inventive concept. Referring to FIGS. 4 and 7, the goods 11 may fall in the peripheral area 32_1 out of the reference area 31_1. For example, the goods 11 may fall to get out of the reference area 31_1 in a D3 direction. The D3 direction may be perpendicular to the moving direction (e.g. the second direction) of the carrier (e.g. the first carrier 21). In detail, the D3 direction may be toward an outer side of the sorting opening. The recognizer 100 may output the material information on the goods 11 and the ID information on the carrier 21 together with warning data including information about the falling point of the goods 11.

Referring to FIGS. 3 and 7, the recognizer 200 may receive the warning data, the material data, and the ID information on the carrier 21. The analyzer 200 may determine a worn state of the rubber belt of the carrier 21 on the basis of the warning data and the material data. For example, when the goods 11 gets out of the reference area 31_1 in the D3 direction, the analyzer 200 may determine that the tilting strength of the carrier 21 is weakened and adjust an operation strength of the carrier 21. For example, the analyzer 200 may determine the operation strength of the carrier 21 to be adjusted to a positive value. When the operation strength of the carrier 21 is adjusted to the positive value, the tilting strength of the carrier 21 may be strengthened. Exceptionally, when the goods 11 falls in the range out of the reference area 31_1 but does not get out of a specific range, the analyzer 200 may not adjust the operation strength of the carrier 21.

The analyzer 200 may reflect the material information on the goods 11 in order to adjust the operation strength of the carrier 21. For example, even though the carrier 21 tilts with an identical strength, a falling speed may be different according to the material of the goods 11. When the goods 11 is formed of a material having a large friction force, the goods 11 may fall slower than the goods 11 having a small friction force. Accordingly, when the goods 11 is formed of a material having a large friction force, the analyzer 200 may adjust the operation strength of the carrier 21 to a positive value but to have a smaller value than that of the goods 11 having a small friction force. The analyzer 200 may transmit analyzed result information including the ID information on the carrier 21 and the operation strength analyzed on the basis of the fall point information and material information on the goods 11.

As described in relation to FIGS. 4 to 7, the recognizer 100 may sense the falling point and material of the goods 11 and transmit, to the analyzer 200, the sensed information and the ID information on the carrier 21. Referring to FIGS. 3 to 7, the analyzer 200 may adjust the operation delay value and/or the strength value of the carrier (e.g. the first carrier 21) on the basis of the sensed information. When the operation delay value and/or operation strength value are adjusted, the tilting speed and/or tilting strength of the carrier 21 may be adjusted. The analyzer 200 may output analyzed result data including the adjusted operation delay value and/or operation strength value together with the ID information on the carrier 21.

Figure 8:
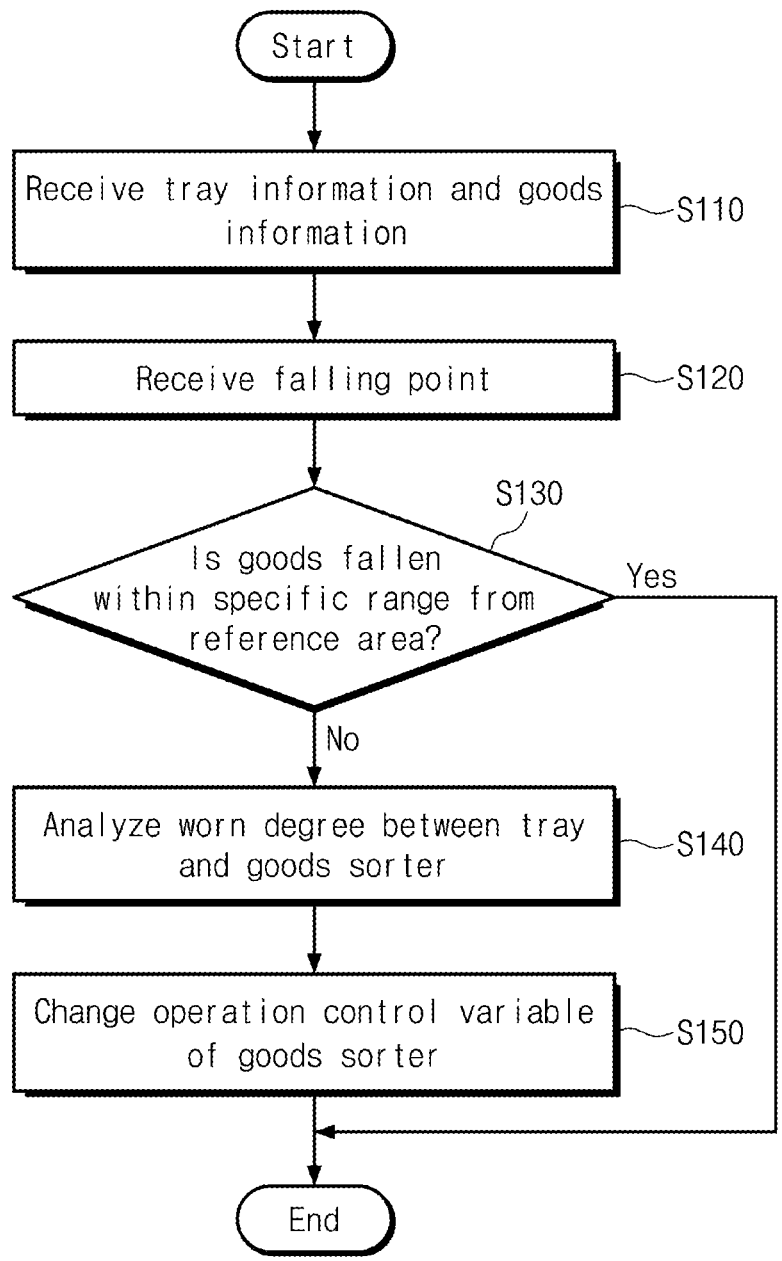
FIG. 8 is a flowchart illustrating a goods sorter control method of a control system according to an embodiment of the inventive concept.

FIG. 8 is a flowchart illustrating a goods sorter control method of a control system according to an embodiment of the inventive concept. Referring to FIGS. 1 to 8, the analyzer 200 may receive, from the recognizer 100, the information on the carrier 21 and the information on the goods 11 (operation S110). In detail, the analyzer 200 may receive, from the recognizer 100, the ID information including a unique number of the carrier 21 and the material information on the goods 11. Also the analyzer 300 may receive, from the recognizer 100, the information about the falling point of the goods 11 (operation S120). In detail, the analyzer 200 may receive information about a position of the goods that gets out of the reference area 31_1 of the sorting opening 30_1.

The analyzer 200 may determine whether the goods 11 falls within the specific range from the reference area 31-1 (operation S130). In detail, the analyzer 200 may determine whether the goods 11 falls in excess of the specific range from the reference area 31-1 (operation S130). When the goods 11 falls in excess of the specific range from the reference area 31_1, the analyzer 200 may predict and analyze the worn degree of the rubber belt between the carrier 21 and the goods sorter 20 (operation S140). The method of analyzing the worn degree of the analyzer 200 has been described in relation FIGS. 4 to 8, and a detailed description thereabout will be omitted. When the goods 11 falls within the reference area 31_1 or within the specific range from the reference area 31_1, the analyzer 200 may not analyze the worn degree of the rubber belt between the carrier 21 and the goods sorter 20.

The analyzer 200 may transmit the analyzed result data to the controller 300. The controller 300 may control the operation control variable of the goods sorter 20 on the basis of the analyzed result data. In detail, the controller 300 may control the operation control variable of the carrier (e.g. the first carrier 21) to control the tiling speed and strength of the carrier 21.

In this way, the recognizer 100, the analyzer 200 and the controller 300 may adjust the operation control variable to prevent the goods 11 from being wrongly sorted.

According to an embodiment of the inventive concept, a control system may control a speed of a goods sorter such that a rubber belt of the goods sorter is slowly worn down.

The above-disclosed subject matter is to be considered illustrative and not restrictive, and the appended claims are intended to cover all such modifications, enhancements, and other embodiments, which fall within the true spirit and scope of the inventive concept. Thus, to the maximum extent allowed by law, the scope of the inventive concept is to be determined by the broadest permissible interpretation of the following claims and their equivalents, and shall not be restricted or limited by the foregoing detailed description.

What is claimed is:

1. A control system comprising:
a controller configured to manage ID information comprising a unique number of a carrier on which a goods is mounted from among a plurality of carriers provided to tilt in a second direction or a third direction, which is perpendicular to a first direction, such that each of the carriers moves along the first direction on a goods sorter and sorts the goods to at least one of a plurality of sorting openings;
a recognizer disposed on the at least one sorting opening and configured to sense a material of the goods and a falling point at which the goods falls in a sorting opening corresponding to the ID information; and
an analyzer configured to generate result data obtained by analyzing at least one of a tilting speed and a tilting strength of the carrier on which the goods is mounted on the basis of the ID information, the falling point and information on the material of the goods,
wherein the controller outputs a controls signal such that the at least one of the tilting speed and the tilting strength of the carrier on which the goods is mounted is controlled based on the result data.

2. The control system of claim 1, further comprising a transmitter configured to transmit the control signal to the goods sorter.

3. The control system of claim 1, wherein the analyzer is configured to analyze a magnitude of a friction force between the goods and the carrier on which the goods is mounted on a basis of the material information.

4. The control system of claim 1, wherein the recognizer comprises a camera configured to capture an image of the falling point and the material of the goods.

5. The control system of claim 1, wherein the recognizer comprises a sensor configured to sense the falling point and the material of the goods.

6. The control system of claim 1, wherein the recognizer is configured to output warning data and the material information on the goods, when the goods falls out of a reference area set based on the sorting opening corresponding to the ID information.

7. The control system of claim 6, wherein the analyzer is configured to generate the result data so as to adjust, to a negative value, an operation delay value of the carrier on which the goods is mounted on a basis of the warning data and the material information, when the goods falls out of the reference area in the first direction.

8. The control system of claim 6, wherein the analyzer is configured to generate the result data so as to adjust, to a positive value, an operation delay value of the carrier on which the goods is mounted on a basis of the warning data and the material information, when the goods falls out of the reference area in a reverse direction to the first direction.

9. The control system of claim 6, wherein the second direction is toward an entrance of the sorting opening corresponding to the ID information and is perpendicular to the first direction, and when the goods falls out of the reference area in the second direction, the analyzer is configured to generate the result data so as to adjust, to a positive value, the tilting strength of the carrier on which the goods is mounted on a basis of the warning data and the material information.

10. The control system of claim 6, wherein the analyzer is configured to generate the result data such that at least one of the tilting speed and the tilting strength of the carrier on which the goods is mounted is adjusted, when the goods falls in excess of a specific range from the reference area.

11. An operation method of a control system comprising one or more computing devices, each of which comprises a processor, the operation method comprising:

receiving, by a processor, a falling point of and material information on a goods sensed by a recognizer, which is disposed on at least one of a plurality of sorting openings and comprises at least one of a sensor and a camera, in a goods sorter comprising the plurality of sorting openings and a plurality of carriers configured to sort a goods into at least one of the plurality of sorting openings;

generating, by the processor, result data by analyzing at least one of a tilting speed and a tilting strength of a carrier on which the goods is mounted among the plurality of carriers on a basis of the falling point of and the material information on the goods; and outputting, by the processor, a controls signal such that the at least one of the tilting speed and the tilting strength of the carrier on which the goods is mounted is controlled based on the result data.

12. The operation method of claim 11, wherein information about the falling point of the goods comprises a falling point of the goods fallen out of a reference area of the at least one sorting opening.

\* \* \* \* \*